United States Patent Office 3,641,107
Patented Feb. 8, 1972

3,641,107
PURIFICATION PROCESS FOR UNSATURATED ORGANIC NITRILES
Ernest J. Breda, Beaumont, Tex., assignor to E. I. du Pont de Nemours and Company, Wilmington, Del.
No Drawing. Filed Oct. 21, 1968, Ser. No. 769,416
Int. Cl. C07c 121/30, 121/32
U.S. Cl. 260—465.9   10 Claims

ABSTRACT OF THE DISCLOSURE

Unsaturated organic nitriles containing ionizable cyanide impurities are freed from the cyanide impurities by intimately contacting the nitrile with nitrogen base selected from the group consisting of tertiary amines, quaternary ammonium hydroxides and mixtures thereof and distilling off the purified nitrile.

BACKGROUND OF THE INVENTION

In recent years, unsaturated organic nitriles have become very important as chemical intermediates. For instance, acrylonitrile has become a particularly valuable intermediate in the manufacture of a wide range of products such as plastics, rubber, synthetic fibers, soil conditioners and the like.

For many uses, the nitriles must be highly pure. While efficient methods have been devised for removing most impurities, there is still needed an improved method for removing ionizable cyanide impurities. In acrylonitrile, for instance, hydrogen cyanide impurities are especially undesirable, and with present removal methods it is particularly difficult to remove trace amounts of them. In addition, present distillation methods necessitate high reflux ratios, which involve high cost of material, and give only poor space-time yields. Other methods, employing additives such as sodium carbonate, are also plagued by excessive yield losses and operating difficulties.

Thus, there is needed an improved process for purifying unsaturated organic nitriles, containing ionizable cyanide impurities, which is efficient and economical.

SUMMARY OF THE INVENTION

In accordance with the present invention there is provided an improved process for purifying unsaturated organic nitriles, containing ionizable cyanide impurities, which results in a high degree of cyanide elimination with low yield losses and which is economical. This improved process comprises intimately contacting the unsaturated organic nitrile e.g., an acrylonitrile, which contains the ionizable cyanide impurities, with nitrogen base selected from the group consisting of tertiary amine, quaternary ammonium hydroxide and mixtures thereof, preferably in the presence of water, and distilling off the purified nitrile. This improved process is especially useful in removing hydrogen cyanide impurities from acrylonitrile, preferably using tertiary amine.

DESCRIPTION OF PREFERRED EMBODIMENTS

The improved process of this invention is useful for removal of ionizable cyanide impurities from any unsaturated organic nitriles, especially the olefinic nitriles, such as those falling within the general formula

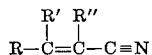

where R, R', and R" can be the same or different and are each independently selected from the group consisting of hydrogen and alkyl, and alkenyl radicals. Representative examples of unsaturated organic nitriles include acrylonitrile, methacrylonitrile, crotonitrile, alpha-ethyl acrylonitrile, alpha-propyl acrylonitrile, alpha, beta-dimethyl acrylonitrile, beta-ethyl acrylonitrile, alpha-vinyl acrylonitrile, diethylallylacrylonitrile and mixtures thereof. The improved process is of particular value in removal of ionizable cyanide impurities from acrylonitrile.

The improved process is useful in removing any ionizable cyanide impurities from unsaturated organic nitriles. Representative examples of such ionizable cyanide impurities include hydrogen cyanide, sodium cyanide, potassium cyanide, calcium cyanide and lead cyanide. The improved process is of particular value in removing hydrogen cyanide impurities from unsaturated organic nitriles, especially from acrylonitrile.

The impure nitrile is intimately contacted with nitrogen base selected from the group consisting of tertiary amine, quaternary ammonium hydroxide and mixtures thereof. Tertiary amines are preferred. Any tertiary amine can be used, such as, for example, the trialkyl-, triaryl-, dialkylaryl- and unsaturated heterocyclic amines. Representative examples of specific tertiary amines include trimethylamine, triethylamine, tri-n-propylamine, tri-iso-propylamine, tri-n-butylamine, tri-iso-butylamine, tri-isoamylamine, pyridine, quinoline, alpha-picoline, 2,6-lutidine, N,N-dimethylaniline, triphenylamine and tribenzylamine. Especially preferred is trimethylamine.

Similarly, any quaternary ammonium hydroxide can be used, such as, for example, the tetraalkyl-, trialkylaryl-, dialkyldiaryl- and trialkylalkylene-ammonium hydroxides. Representative examples of specific quaternary ammonium hydroxides include tetramethylammonium hydroxide, tetraethylammonium hydroxide, tetrabutylammonium hydroxide, trimethylvinylammonium hydroxide, trimethylbenzylammonium hydroxide, triethylbenzylammonium hydroxide and dimethyldibenzylammonium hydroxide. Especially preferred quaternary ammonium hydroxides are tetramethylammonium hydroxide and tetrabutylammonium hydroxide.

The amount of nitrogen base used is not critical to the success of this invention. However, it has been found that when amounts substantially less than about 0.001 percent by weight of the impure nitrile are used, the cyanide elimination efficiency substantially decreases. On the other hand, when amounts substantially greater than about 2.5 percent by weight of the impure nitrile are used, the cyanide elimination efficiency does not correspondingly increase sufficiently to justify such use of greater amounts from the standpoint of both economics and mechanical ease of separation of the purified nitrile. Accordingly, the amount of nitrogen base used is preferably about from 0.001 to 2.5 percent by weight of the impure nitrile. Optimum conditions with respect to cyanide elimination efficiency, economics and mechanical ease of separation of the purified nitrile are found to exist when the amount of nitrogen base is about from 0.01 to 0.20 percent by weight of the impure nitrile and, accordingly, this range is especially preferred.

The nitrogen base is intimately contacted with the impure nitrile. Since water increases the cyanide elimination efficiency of the nitrogen base, the contact is preferably made in the presence of water, amounts of about from 1 to 5 parts by weight of water for every part by weight of impure nitrile being especially preferred.

The nitrogen base is added to the impure nitrile and mixed, preferably with agitation. When water is used, the above mixture can be added to the water with agitation or the nitrogen base can be added to the water and this mixture can be added to the impure nitrile with agitation.

The intimate contact can be achieved by refluxing the mixture at about atmospheric pressure. While super or subatmospheric pressures, e.g., about from 10 to 0.1 atmospheres, can be employed if necessary, atmospheric pressure is used as a matter of convenience.

The mixture is refluxed at temperatures corresponding to the boiling point of the substituents. For impure acrylonitrile, at about atmospheric pressure, this temperature is about from 60 to 80° C. and, preferably, about from 70 to 75° C. Reflux is continued for a time sufficient to ensure reaction of the components. This is generally about from 1 to 60 minutes and, preferably, about from 15 to 30 minutes.

The refluxed mixture is then cooled to about ambient temperature. If water is used, the organic and aqueous phases are allowed to separate, and the organic phase is drawn off by decantation, centrifugation or the like. The purified nitrile is then distilled off from the organic phase and collected.

In addition to the batch type of process described above, the process of this invention can be carried out by continuous extractive distillation. This continuous method of effecting the intimate contact of the components and the distillation of the purified nitrile is especially useful on a plant scale.

Extractive distillation is a method of separation or fractionation wherein a separating agent or solvent is added to the reaction mixture so as to increase the relative volatility of the components. The separating agent or solvent is relatively non-volatile compared with the components to be separated, and when added, changes the volatility of the components. The change is not the same for each component and the resulting difference in volatility permits fractionating of the components. The separating agent or solvent is added continuously near the top of the distilling column and allowed to run down the column as reflux, being present in appreciable concentration on all the plates. For a more detailed discussion of the principles of extractive distillation, see John F. Perry, Chemical Engineers' Handbook, 3rd ed., McGraw-Hill Book Company, Inc. (1950), pp. 629–651.

The employment of continuous extractive distillation in the improved process of this invention is illustrated by the following general procedure, using water as the separating agent. A mixture of water, nitrogen base and impure nitrile are charged into the reboiler pot of the distillation apparatus. Heat is applied and, when apparent equilibrium is reached in the column and while the boiling in the pot is continued, an aqueous feed phase comprising water and nitrogen base is started near the top of the column. At the same time an organic feed phase comprising impure nitrile is started at a lower point on the column. The aqueous phase moves down the column counter to the organic phase moving upward. As distillate is continuously taken off the top, a purge is continuously taken from the reboiler pot to maintain a contant liquid level. Also, the feeds and distillate taken off are regulated to maintain equilibrium during the operation.

The following examples serve to further illustrate the improved process of this invention. In the examples, parts and percentages reported are by weight.

EXAMPLE 1

100 parts of crude acrylonitrile (ACRN), containing 1460 p.p.m. of hydrogen cyanide (HCN) impurities, are combined with 50 parts of water and 350 parts of 0.014 percent aqueous trimethylamine (TMA). The mixture is shaken for one minute to contact the organic and aqueous phases. The mixture is refluxed at 72° C. for 20 minutes, cooled, and the layers separated. The organic (top) layer is distilled through an unpacked distilling column at atmospheric pressure and reflux ratio of 2/1 (2 parts taken off for every 1 part returned). The distillate of purified acrylonitrile contains about one p.p.m. of HCN.

EXAMPLE 2

0.160 parts of 22 percent aqueous TMA are added to 100 parts of crude ACRN, containing 987 p.p.m. of HCN impurities, and mixed by shaking for one minute. 350 parts of water are then added to the mixture which is again shaken for about one minute. Then the mixture is refluxed for 15 minutes at 70–72° C. and cooled. The layers are separated. The organic (top) layer is distilled through an unpacked distilling column at atmospheric pressure and a reflux ratio of 2/1. The distillate of purified acrylonitrile contains less than one p.p.m. of HCγ.

EXAMPLE 3

Gaseous TMA is passed into 100 parts of crude ACRN, containing 987 p.p.m. of HCN impurities, at a rate of 0.026 part per minute for one minute. The mixture is shaken for 15 seconds. 100 parts of water are added. The mixture is shaken for one minute, refluxed for 30 minutes at 72° C. and cooled. The layers are separated. The organic (top) layer is distilled through an unpacked distilling column at atmospheric pressure and a reflux ratio of 2/1. The distillate of purified acrylonitrile contains about one p.p.m. of HCN.

EXAMPLE 4

100 parts of crude ACRN, containing 1574 p.p.m. of HCN impurities, are combined with 50 parts of water and 350 parts of 0.25 percent aqueous TMA. The mixture is shaken for about one minute to contact the organic and aqueous phases. The mixture is then refluxed at 73° C. for 20 minutes and cooled to allow the layers to separate. The organic (top) layer is distilled through an unpacked distilling column at atmospheric pressure and reflux ratio of 2/1. The distillate of purified acrylonitrile contains about one p.p.m. of HCN.

EXAMPLE 5

100 parts of crude ACRN, containing 1500 p.p.m. of HCN impurities, are combined with 50 parts of water and 350 parts of 0.05 percent aqueous TMA. The mixture is shaken for about one minute to contact the organic and the aqueous phases. The mixture is then refluxed at 72° C. for 19 minutes and cooled to allow the layers to separate. The organic (top) layer is distilled through an unpacked distilling column at atmospheric pressure and reflux ratio of 2/1. The distillate of purified acrylonitrile contains about two p.p.m. of HCN.

EXAMPLE 6

The reboiler pot of an extractive distillation apparatus is charged with about 400 parts of 0.25 percent aqueous TMA and about 100 parts of crude ACRN, containing 2011 p.p.m. of HCN impurities. 0.22 percent aqueous TMA constitutes the aqueous phase feed to the extractive column. Heat is applied to the reboiler pot. When apparent equilibrium is reached in the column and while boiling is continued in the pot, the feed aqueous phase is started to the column at an upper point. At about the same time crude ACRN, containing HCN impurities (organic phase), feed is also started at a lower point on the column. Semi-pure ACRN (distillate) containing less than one p.p.m. of NCN is taken off overhead. Distillation is continued by feeding one part of crude ACRN for each four parts of aqueous phase. The aqueous phase moves down the column counter to the organic phase moving upward. Distillate (organic phase after contact with TMA and water) is taken off at a reflux ratio of 2/1. A purge is continuously taken from the reboiler pot to maintain a constant liquid level. The feeds to the column and the distillate takeoff are regulated to maintain equilibrium during the operation. The distillate collected overhead is refined in an unpacked distilling column and the product collected. The distillate of purified nitrile contains no detectable HCN.

In the above examples, methacrylonitrile, crotonitrile, alpha-ethyl acrylonitrile, alpha-propyl acrylonitrile, alpha, beta-dimethyl acrylonitrile, beta-ethyl acrylonitrile, mixtures thereof or mixtures thereof with acrylonitrile, containing ionizable cyanide impurities, such as hydrogen cyanide, sodium cyanide, potassium cyanide, calcium cyanide or lead cyanide, can be substituted for acrylonitrile on an equal weight basis with similar results. In any such substitutions, the reflux temperature should correspond with the respective boiling points of the substituents.

Also, in the above examples, triethylamine, tri-n-propylamine, tri-iso-propylamine, tri-n-butylamine, tri-iso-butylamine, tri-iso-amylamine, pyridine, quinoline, alpha-picoline, 2,6-lutine, N,N-dimethylaniline, triphenylamine, tribenzylamine, tetrabutyl ammonium hydroxide, tetramethylammonium hydroxide, mixtures thereof or mixtures thereof with trimethylamine can be substituted for trimethylamine on an equal weight basis with similar results. Finally, Examples 1–5 can be carried out in the absence of water with similar results, although with a lower cyanide elimination efficiency.

What is claimed is:

1. In the post-reaction process for purifying an acrylonitrile selected from the group consisting of acrylonitrile, alkyl substituted acrylonitrile and alkenyl substituted acrylonitrile containing ionizable cyanide impurities, which comprises distilling off the purified acrylonitrile, the improvement comprising intimately contacting by refluxing said acrylonitrile prior to distillation with at least about 0.001% by weight tertiary amine, in the presence of about 1 to 5 parts by weight of water per part of acrylonitrile thus forming an aqueous and organic phase, and recovering the resulting purified nitrile from the organic phase by distillation.

2. The process of claim 1 wherein said cyanide impurity is hydrogen cyanide.

3. The process of claim 2 wherein said nitrile is acrylonitrile.

4. The process of claim 3 wherein said nitrile is intimately contacted with at least one tertiary amine.

5. The process of claim 4 wherein said tertiary amine is at least one of the group consisting of trimethylamine, triethylamine, tri-n-propylamine, tri-iso-propylamine, tri-n-butylamine, tri-iso-butylamine, tri-iso-amylamine, pyridine, quinoline, alpha-picoline, 2,6-lutidine, N,N-dimethylaniline, triphenylamine and tribenzylamine.

6. The process of claim 5 wherein said tertiary amine is trimethylamine.

7. The process of claim 6 wherein said nitrile is intimately contacted with about from 0.001 to 2.5 percent by weight of trimethylamine.

8. The process of claim 6 wherein said acrylonitrile is intimately contacted with about from 0.01 to 0.20 percent by weight of trimethylamine in the presence of about from 2 to 5 parts by weight of water.

9. The process of claim 8 wherein said intimate contact is made at about atmospheric pressure by refluxing at about 60° to 80° C. for about from 1 to 60 minutes.

10. The process of claim 6 wherein said intimate contact and said distillation are effected by continuous extractive distillation.

References Cited
UNITED STATES PATENTS

| | | | |
|---|---|---|---|
| 2,375,015 | 5/1945 | Marple et al. | 260—465.9 |
| 2,434,606 | 1/1948 | Carpenter | 260—465.9 |
| 2,678,943 | 5/1954 | Taylor | 260—465.9 |
| 2,678,944 | 5/1954 | Burland | 260—465.9 |
| 2,847,452 | 8/1958 | Applegath et al. | 260—465.9 |
| 3,017,426 | 1/1962 | Ruffing et al. | 260—465.9 |
| 3,267,129 | 8/1966 | Roth | 260—465.3 |
| 3,329,582 | 7/197 | Sennewald et al. | 260—465.3 X |

JOSEPH P. BRUST, Primary Examiner

U.S. Cl. X.R.

203—39, 96